United States Patent [19]
Zeunen et al.

[11] 3,897,149
[45] July 29, 1975

[54] PHOTOGRAPHIC EXPOSURE APPARATUS

[75] Inventors: Barthel Zeunen, Clarkston; Rex C. Grace, Troy; Alvie R. Dunn, Madison Heights, all of Mich.

[73] Assignee: Capitol Reproductions, Inc., Madison Heights, Mich.

[22] Filed: Feb. 22, 1974

[21] Appl. No.: 445,023

Related U.S. Application Data

[63] Continuation-in-part of Ser. No. 213,398, Dec. 29, 1971.

[52] U.S. Cl. ................................. 355/97; 355/111
[51] Int. Cl. .......................................... G03b 27/04
[58] Field of Search ..................... 355/97, 103, 111

[56]          References Cited
         UNITED STATES PATENTS

| | | | |
|---|---|---|---|
| 1,804,739 | 5/1931 | Brunk | 355/103 |
| 2,243,048 | 5/1941 | Foster | 355/103 |
| 2,408,310 | 9/1946 | Hassler | 355/103 |
| 3,160,086 | 12/1964 | Davis | 355/111 |
| 3,676,001 | 7/1972 | Botkin | 355/12 |
| 3,677,640 | 7/1972 | Nakatani | 355/97 |

*Primary Examiner*—John M. Horan
*Attorney, Agent, or Firm*—Hauke, Patalidis & Dumont

[57] ABSTRACT

A portable photographic exposure apparatus for making accurate reproductions of engineered drawings, body drafts or the like in which a film and drawing are fed simultaneously into a flat plane exposure area. The apparatus includes a wheeled cabinet structure, which preferably includes an internal continuous supply of film, and an exposure unit mounted on the cabinet having a source of light and a source of static electricity. The static charge is used to press the film and drawing together, to smooth the drawing against the film for contact and extremely close dimensional accuracy of the reproduction, and to eliminate creases or air bubbles. The exposed film and drawing may be separated and the film fed to a developer, which may be attached to or adjacent the cabinet structure. An improved guide system for aligning and feeding the film and drawing is incorporated which comprises a system of edge alignment bars and a combination of differently formed driving and driven rollers at the front and rear of the cabinet, respectively, to assure absolute alignment and precision duplication of the original drawing.

18 Claims, 8 Drawing Figures

PHOTOGRAPHIC EXPOSURE APPARATUS

RELATIONSHIP TO OTHER APPLICATION

The present application is a continuation-in-part of U.S. application Ser. No. 213,398, filed on Dec. 29, 1971, for "Photographic Exposure Apparatus", which application is of common ownership and inventorship herewith.

BACKGROUND OF THE INVENTION

I. Field of the Invention

This invention relates to improvements in portable photographic exposure apparatus of the type generally used to expose large sheets of film which are fed into the apparatus, along with large loft drawings, body drafts and the like, for making extremely accurate photographic reproductions, and to the type of exposure apparatus which is portable and may readily be moved relatively close to the area where the drawing is being prepared.

This invention relates more specifically to the type of exposure apparatus which may make photographic reproductions of virtually any length and width and which uses electrostatic processes for adhering the film to the drawing during the infeed and exposure operations.

II. Description of the Prior Art

In the reproduction of large, polyester sheet engineered drawings and drafts, it is customary to ship the completed drawings to a different facility for photographic processing to make the necessary reproduction, and the shipping and handling for purposes of making reproductions is a relatively expensive process. Furthermore, there is the attendant risk of damage and the possibility of temperature and humidity changes which cause distortions in size. This cannot be permitted where very accurately dimensioned drawing reproductions are a necessity since the reproduction is an exact duplicate of the original and is used as a master to construct tools, dies, machined parts and the like. All types of dimensionally stable films are suitable for use in connection with the present invention.

A portable exposure apparatus which may readily be moved into the area wherein the drawing is initially prepared has been proposed heretofore, as in U.S. Pat. No. 3,723,001 for "Photographic Exposure Apparatus" issued Mar. 27, 1973, which patent is of common inventorship and ownership herewith. This patent shows and describes an apparatus for making a film exposure directly from a drawing still positioned on a drawing board.

The present invention relates to several improvements over the apparatus described in that patent and over that apparatus shown in the parent application of the present application. It will additionally be seen that the present invention variously relates to improvements in those elements which together form the guide system for transporting the film and drawing into and through the exposure area in such manner as to insure their accurate registration before and during feeding. It further insures that there is a close attraction of film and drawing together through the use of a static electricity bar and by the arrangement of drive and guide rollers of particular configuration, further contributes to the controlled feed of the system.

SUMMARY OF THE INVENTION

The present invention contemplates an improved portable exposure apparatus which can be used to control the reproduction of the drawings with a minimum amount of handling of the drawings in the area where they are prepared, therefore eliminating expensive shipping, handling and the attendant risk of damage. The dimensionally stable film used with this apparatus may be stored on a large roll within the apparatus and thus the drawings to be reproduced may be of virtually unlimited length. The film is made of a polyester material as described above and has a light sensitive coating thereon to provide a reproduction when exposed under or over the drawing. Such film is of a material that lends itself to being closely held to the drawing by an electrostatic charge which in accordance with the teachings of the present invention is projected from a specially constructed electrode mounted directly in advance of the exposure unit. The present invention even more particularly relates to an improved feeding and alignment system for the drawing and film.

DESCRIPTION OF THE DRAWINGS

The present invention, its objects and advantages, will become apparent upon reading the following detailed description in conjunction with the accompanying drawings, wherein like reference characters refer to like parts throughout the several views, and in which.

DETAILED DESCRIPTION OF THE INVENTION

Figure 2:
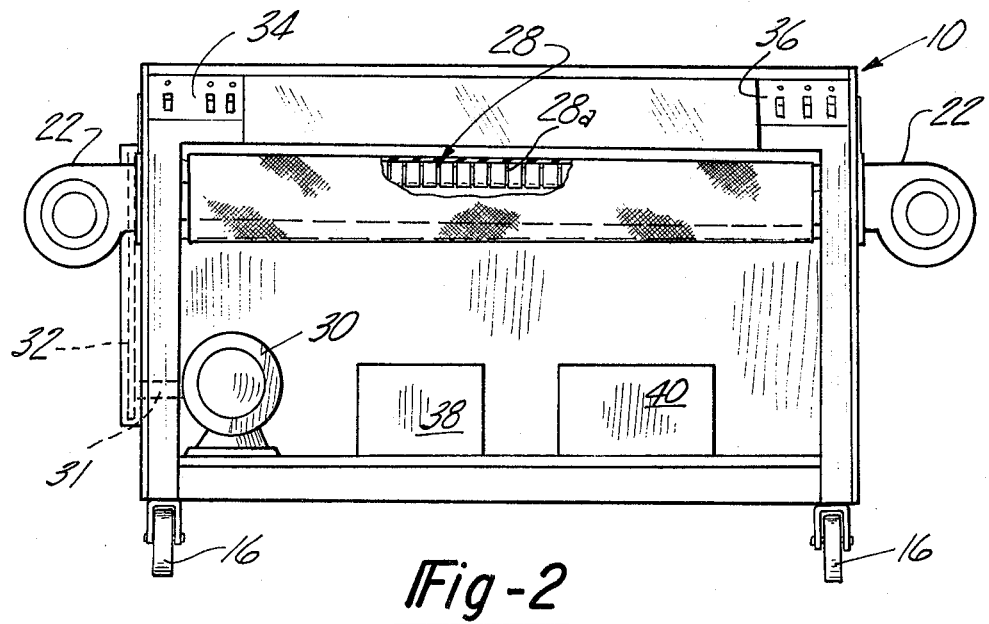
FIG. 2 is a front elevational view of the apparatus of FIG. 1 with parts broken away to illustrate the input portion of the feed and guide system of the present invention.
Figure 3:
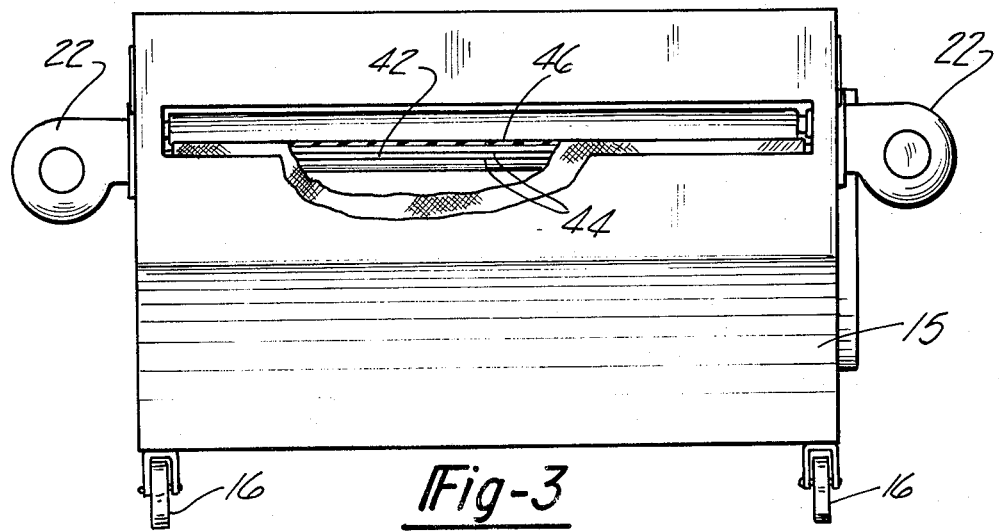
FIG. 3 is a rear elevational view of the apparatus of FIG. 1 with parts broken away illustrating a roller assembly for guiding the exposed film and drawing as they are ejected from the film exposure area.
Figure 4:
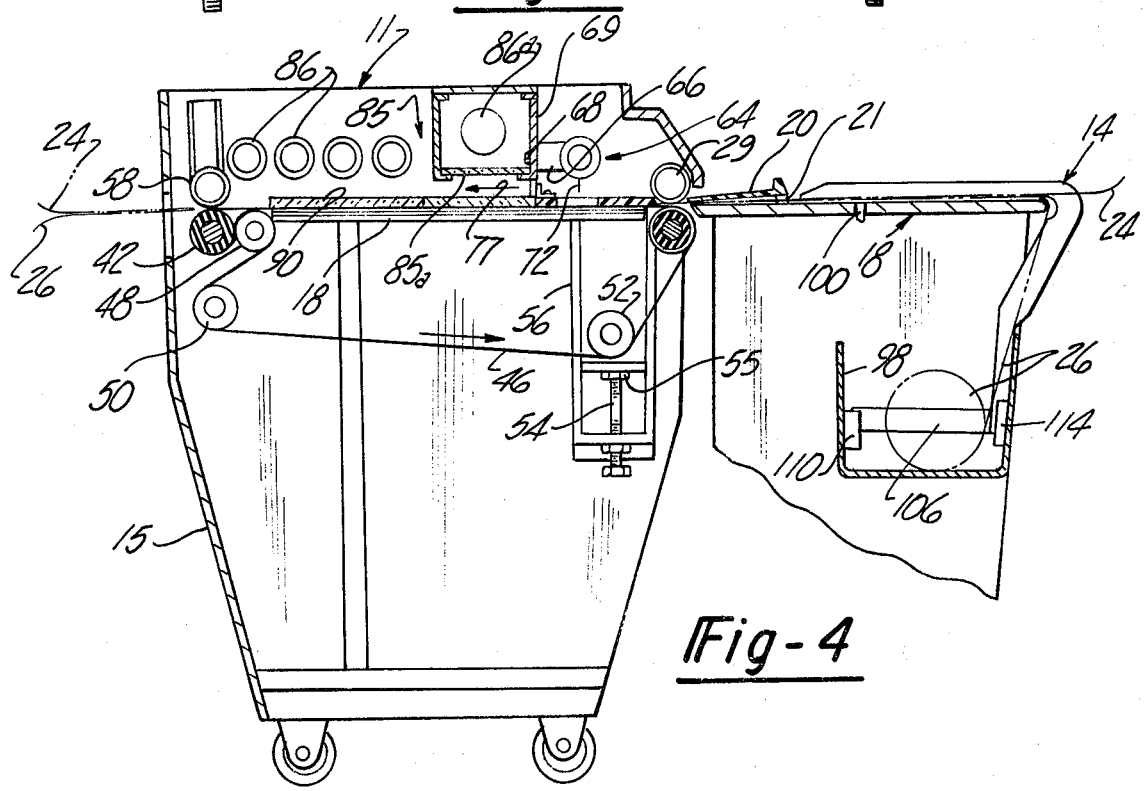
FIG. 4 is a cross-sectional view of the apparatus of FIG. 1 illustrating the film and drawing feed system together with the drive system and the exposure means used.

FIGS. 1 through 5 illustrate a preferred photographic exposure apparatus 10 of the present invention comprising a support cabinet 12 and an exposure unit 11 mounted under the cover and at the top of the cabinet 12. As first indicated in FIG. 1, there is included an edge alignment system 14 at the front portion of the apparatus, which system permits precise alignment of film and drawing with provision for adjusting for different widths. It will be understood that the maximum length of the drawing to be copied is for all intents and purposes limited only by the commercially available length of film which may be separately provided, or alternately unwound, from a roll stored in the front end of the cabinet 12 as best shown in FIG. 4.

The cabinet 12 is generally rectangular and has vertical side walls 13 and end walls 15 which slope upwardly and outwardly, while a series of casters 16 are provided to permit the entire apparatus to be transported at will or, if desired, to be moved adjacent to a table where the drawing is being prepared. The cabinet 12 further includes a flat top or platform 18 across which a film and drawing are moved during exposure of the film. An inlet or opening 21 is defined between the flat top of platform 18 and an upper transparent plexiglass plate 20.

Figure 1:
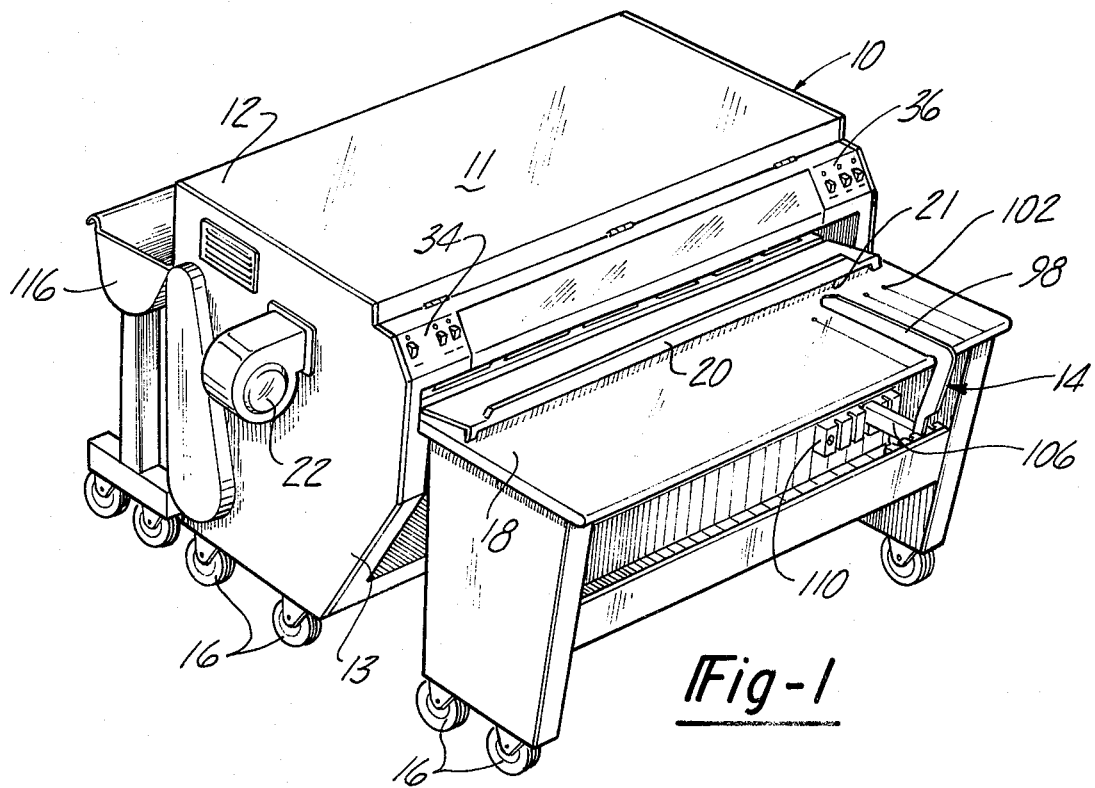
FIG. 1 is a front perspective view of a preferred photographic exposure apparatus employing the system and embodying the principles of the present invention.

FIGS. 1 and 2 show the left and right end extensions of a cooling chute 22 which provides a cooling air flow system to remove heat from the exposure area. One or more fans are incorporated to provide the necessary flow of air. The drawing and film are identified by the numerals 24 and 26, respectively, in FIG. 4. FIG. 2 additionally shows the drive means for the rear drive roller 42, which drive means comprises an electrical motor 30 which has its output shaft 31 connected through a drive chain 32 to the left end of the drive roller 42. A driven or idler roller 28 is positioned at the right hand inlet end of the apparatus. The various speed controls for the motor 30 and the controls for the light intensity of the exposure unit 11 are indicated generally by the numerals 34 and 36, respectively. Also shown in FIG. 2 is the power supply 38 for the several high intensity lights incorporated in the exposure unit 11 and the power supply 40 for the static electricity system later to be described.

FIG. 3 shows the apparatus with the rear cover partially broken away to illustrate better the configuration of the rear drive roller of the system, namely roller 42, which has formed on it a plurality of longitudinally extending grooves to form lands 44 to assist in the alignment and removal of the emerging drawing and film as will be explained hereinafter in the section entitled "Description of Operation".

Figure 5:
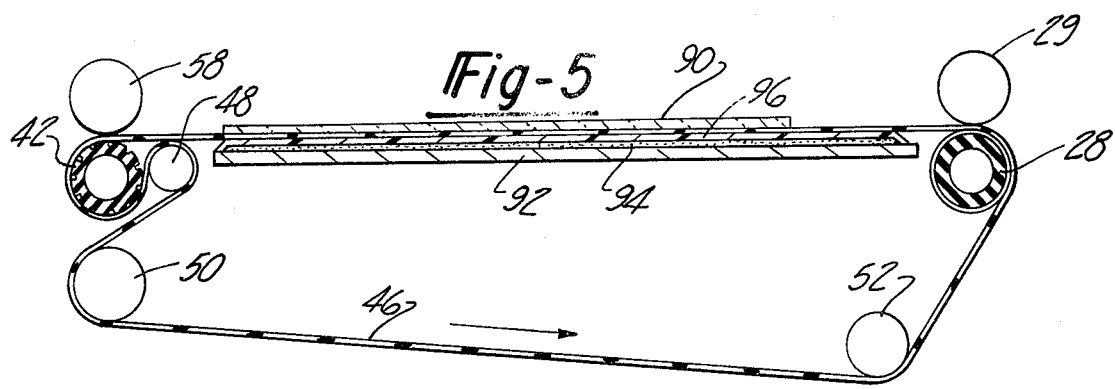
FIG. 5 is a cross-sectional view to enlarged scale illustrating the components of the drive system for the film and drawing.

FIGS. 4 and 5 further show the components of the drive system for the drawing 24 and the film 26. Included in the system are the idler roller 28 located at the front of the apparatus and the drive roller 42 located at the rear of the apparatus. The continuously driven belt 46 is further guided in its path by a series of spaced idler rollers 48, 50 and 52 as shown. The roller 52 may be selectively moved upwardly or downwardly to adjust the tension and change direction of belt 46 travel left to right or vice versa. This is accomplished through the rotation of an adjusting screw 54 and plate 55. These are mounted in a downwardly depending frame 56 fixed to the lower surface of the platform 18. A weighted and vertically displaceable roller 58 is included in the system to maintain the drawing and film together as they exit over the rearwardly located drive roller 42. A further downwardly biased roller 29 is mounted above roller 28 in contact with the upper surface of the drawing 24.

Also as shown in FIG. 4 is the electrostatic discharge bar assembly 64 which includes plastic supports 66 secured to the adjacent side wall 69 by conventional means such as screws 68. The assembly 64, as better shown in FIG. 6 to an enlarged scale, further extends across the width of the exposure apparatus 10 with both ends of the assembly being supported between side walls.

The assembly 64 further includes a dielectric tube 70 carried by the outwardly extending supports 66 and encompassing an electrode 71 from which a series of discharge pins 72 project vertically downward. The pins 72 are maintained in vertical alignment by an insert 74, which is preferably made of plastic material or other dielectric insulating material. When current is supplied to the electrode 71 from the power supply 40 and when the drawing 24 and film 26 are passed beneath the pins 72, they discharge an electrostatic flux field along the leading edge of the exposure unit 12 which produces an electrostatic charge between the film 26, drawing 24 and the adjacent drive belt 46. Thus, all three members are attracted to each other in cooperative driving and driven relationship.

Figure 7:
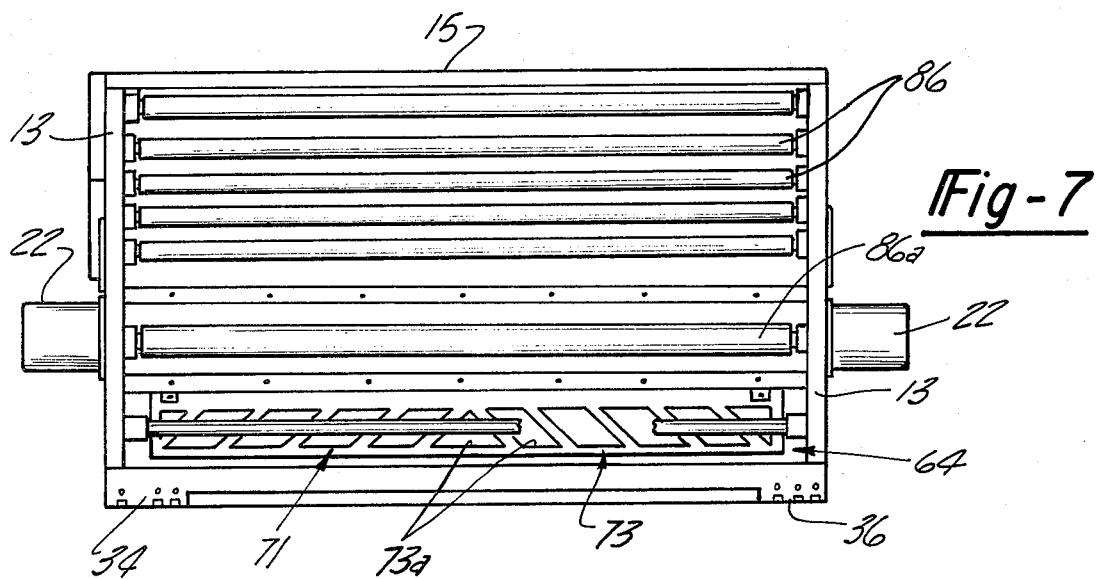
FIG. 7 is a top plan view of the apparatus, with top cover removed, to show the inlet part of the feed system and the principal parts of the exposure unit of the invention.

Because of the operation of the electrode 71 and plastic insert 73 as best shown in FIG. 7, the electrostatic charge is directed by the pattern of openings 73a in insert 73 most effectively at the center and progressively with less intensity toward the side edges so that the film and drawing will be smoothed out and spread toward their side edges. This assists in maintaining that complete intimate contact between the film and drawing which is essential for accurate reproduction, thus eliminating any ripples, wrinkles or air bubbles which might otherwise be entrapped.

Figure 6:
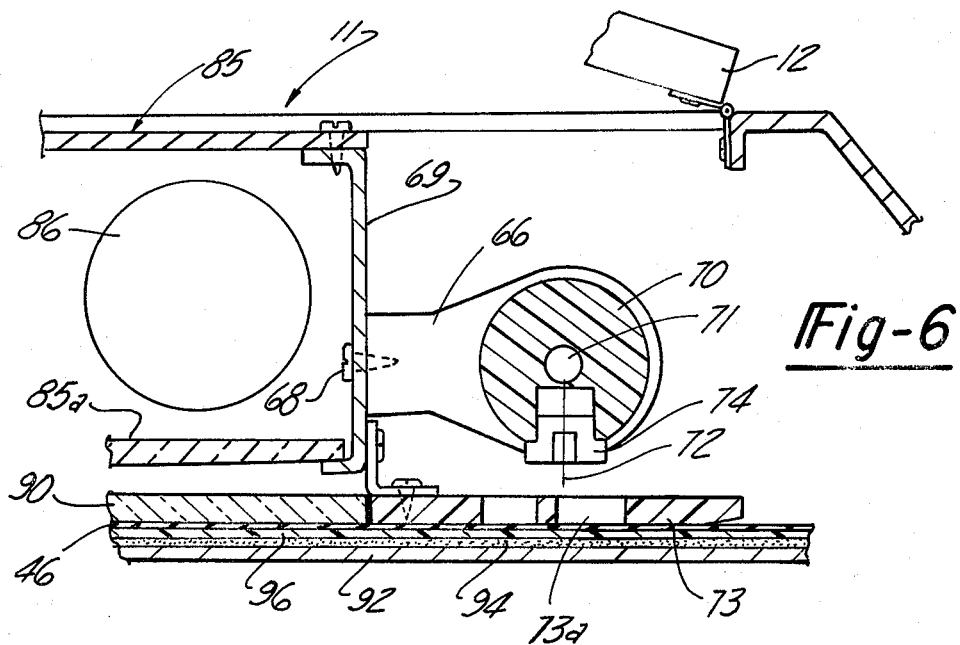
FIG. 6 is an enlarged scale fragmentary view of the front portion of the apparatus of FIG. 4 illustrating the electrostatic discharge apparatus used in the invention together with the detail of the inlet portion of the guide system.

FIGS. 4 and 6 further show the detail of the chute inlet or opening into which the drawing 24 and film 26 are introduced. The right hand opening comprises a slanted plexiglass plate 20 which has at each front corner a downwardly extending portion 21 which serves to define an opening for the drawing, film and drive belt 46.

Also shown in FIGS. 4–8 are additional portions of the exposure unit 11. These include a plurality of exposure lamps 86 which may be incorporated as fluorescent tube lights, which are disposed within the apparatus in such manner as to provide naturally uniform lighting therein for proper exposure as the film is moved through the apparatus. As best shown in FIG. 4, the first of these lamps may be a single, relatively high intensity lamp 86a which is separately housed in a laterally extending enclosure 85 with a lower, pyrex, glass side 85a to protect the film and drawing from excess heat during film exposure. The exposure unit 11, as already indicated, may include a transverse chute 22 connected to a motor driven fan and adapted to discharge cooling air across the exposure lamps 86 and 86a to prevent their overheating, and further to prevent their heat from affecting the coefficient of contraction and expansion of the polyester drawing 24 and polyester film which is being exposed. At least one plate 90 of glass or like transparent material is disposed beneath the exposure lamps 86 and 86a and operates to exert a downward pressure on the film and drawing advancing through the exposure unit, again to assist in keeping them in flat, close registration. It will be seen that the main portion of the platform 18 includes a specialized construction of several different layers which are adapted to provide a combined constant and uniform upward force against the belt 46, again to assist it being held in driving relationship with the film and drawing against its upper surface. These several layers include a flat base layer of sheet metal 92, an intermediate layer of foam rubber material or like resilient sheet material 94, and finally at the upper level and in contact with the belt 46 is a slip sheet formed of Teflon or like material of low coefficient of friction, as indicated by the numeral 96.

Inside the front cover of the unit there is further included a shelf 98, as best shown in FIG. 4, that supports a transverse roll of film 26, which film is unwound over a suitable forward guide edge of the apparatus and passed into the inlet 21 at the feed end of the apparatus.

Figure 8:
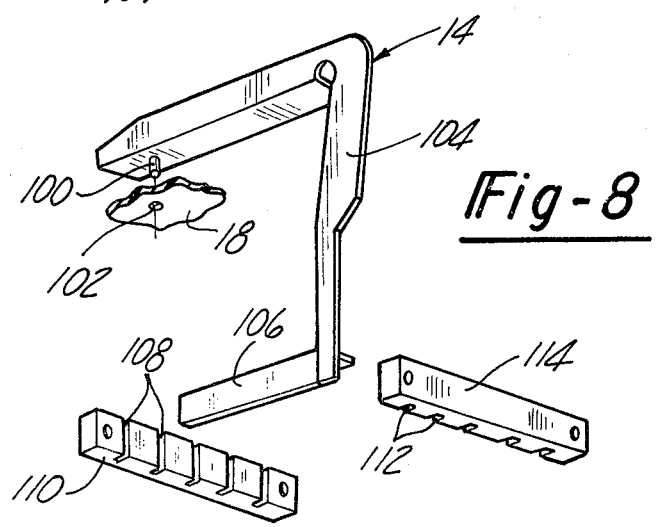
FIG. 8 is a spread perspective view of the parts of the edge alignment system used in connection with the present invention.

The edge alignment system 14 shown in its mounted position in FIG. 4 is also shown in a spread perspective in FIG. 8 to illustrate better the interrelationship of the several parts. The edge alignment system includes an edge alignment bar 14 which is adapted to restrain and guide the right hand edge of the drawing and film which are being threaded through the system for exposure. The bar 14 near its free end has a downwardly extending dowel 100 adapted to be fitted in one of the several mating openings 102 formed in the upper surface of the platform 18, as previously shown in FIG. 1. A downwardly extending arm 104 has fixed to its lower end a second bracing bar 106 which is selectively fitted into notches 108 formed in a forward mount plate 110 and aligned notches 112 formed in an opposed mount plate 114. The edge aligning bar 14 is thus selectively movable to a series of positions to accommodate different width drawings being processed.

FIG. 7 shows the arrangement of exposure lamps 86, 86a and also the electrode 71. The plastic insert 73 has a number of openings 73a formed in it. The openings 73a are shaped and formed in a pattern as shown such that the electrostatic charge is first concentrated at the center through the pins 72 mounted in the electrode 71 and then becomes progressively weaker toward the side edges. Thus, the film 26 and drawing 24 are smoothed out and spread toward their side edges, thus improving the contact between the two. It will be understood that the several exposure lamps 86 and 86a may be energized in any selected combination, separately or together, so that the exposure, such as may be required by the particular coating on the film, will be of the proper intensity. A color filter 77 may be included for adjusting the intensity of the light from the high output lamp 86.

DESCRIPTION OF OPERATION

In preparation for operating the photographic exposure apparatus, the operator first makes a setting on panel 34 to set the speed of operation of the drive motor 30 and on panel 36 to selectively energize the required number of exposure lamps 86 and 86a. The edge alignment apparatus 14 is inserted in the appropriate dowel opening 102 at its upper end and in the appropriate notches 108 and 112 at its lower end so that the initial alignment as between the side of the drawing 24 and the film 26 is correct. This will help insure that the film and drawing will be directed in the proper manner into the feed chute inlet or opening 21. The film and drawing are then threaded into the opening 21 beneath the plexiglass 20. The downwardly directed electrostatic field passes from the opposed pins 72 to provide an electrostatic charge of attraction between the drawing 24, film 26 and the continuous drive belt 46 so that all three are carried leftwardly with respect to FIG. 4 with constant speed between the plate glass 90 and the Teflon slip sheet 96 into the exposure unit 11. When the exposure is completed in the exposure unit 11, the continuous drive belt 46 is guided downwardly around drive roller 42 and returned about the periphery of the front roller 28. It is an important feature with respect to the maintenance of proper alignment that the rearward drive roller 42 has formed on it a plurality of longitudinal grooves and lands 44, as best shown in FIG. 2, while the forward roller 28 has formed on it a plurality of radially formed grooves and lands 28a, as best shown in FIG. 3.

As the film and drawing exit at the rear opening formed in the exposure unit 11, it is desirable to dissipate the electrostatic charge and separate the exposed film 26 from the drawing 24. The large roller 58 accordingly may be metallic and grounded by contact to the side walls of the apparatus to accomplish the dissipation of the electrostatic charge. The drawing 24 and the film 26 may then easily be separated and the film 26 may be contained in a container bin 116 mounted at the rear of the apparatus as shown in FIG. 1. The duration of exposure is controlled by the speed of the motor 30, while the light intensity may be varied by selectively controlling the number of exposure lamps 86, 86a to be energized.

It will thus be seen that by our invention there has been provided an improved feed system for a continuous type photographic exposure apparatus for making reproductions of engineered drawings, body drafts or the like in which the film and drawing are fed simultaneously into an exposure unit. The system includes a novel combination of elements to initially align, contain and properly maintain the contact of the film, drawing and drive belt as they are fed through the apparatus, thus insuring the accuracy of the copy being made. The combination of structural elements used to define the feed path is such that the film and drawing are maintained in close contact throughout the exposure process to insure that this accuracy is maintained.

The described apparatus is only considered as a preferred illustration of the inventive concept and as such is not to be considered as restrictive of the scope of the invention. Various arrangements, changes and modifications may be made by those skilled in the art without departing from the spirit of the invention.

What is claimed is:

1. An apparatus for making a direct photographic reproduction from a loft drawing and the like, comprising:

a light exposure unit;

a support platform extending into said unit;

a feed system including a drive roller and a driven roller, said drive roller having formed about its periphery a plurality of longitudinally extending lands;

a continuous drive belt movable between said rollers for simultaneously advancing a sheet of film and drawing over said platform through said unit, said system further including means defining an opening to receive the forward edge of the film and drawing;

an upper transparent plate in parallel fixed relationship to the platform; and a lower multiple layer support mounted on the upper surface of said platform for providing a yieldable upward force to maintain the film and drawing together and in driven relationship with the continuous drive belt, said multiple layer support including an intermediate resilient member and an upper layer of relatively low coefficient of friction adapted to facilitate movement of the drive belt over it.

2. The combination as set forth in claim 1 wherein the driven roller includes about its periphery a plurality of radially formed lands aligned in the direction of drive belt movement for further maintaining the alignment of the film and drawing during initial entry into the exposure unit.

3. The combination as set forth in claim 1 wherein there is further included a means for regulating the tension in the continuous drive belt for preventing slippage.

4. The combination as set forth in claim 1 wherein there is provided an electrostatic field establishing means for initially charging the film, drawing and drive belt for holding them in mutual contact relationship, said electrostatic field establishing means located proximate the opening of the exposure unit, and wherein a second means for dissipating the electrostatic charge is mounted proximate the exit end of the exposure unit.

5. The combination as set forth in claim 1 wherein said film is rotatably mounted in a roll, transversely supported in the apparatus for providing a continuous film strip engageable with the drawing as the reproduction is being made.

6. The combination as set forth in claim 1 wherein the exposure unit includes a plurality of transversely arrayed lamps, and wherein a means is included for selectively lighting at least one of said lamps to provide the intensity of light required for exposure.

7. The combination as set forth in claim 1 wherein said feed system includes an electrical motor of adjustable speed whereby the time of exposure of the film may be selectively adjusted by controlling the speed of the drive belt.

8. An apparatus for making a direct photographic reproduction from a loft drawing and the like comprising:
a light exposure unit;
a support platform extending into said exposure unit;
a feed system including a continuous drive belt for simultaneously advancing a continuous sheet of film and the drawing over said platform and through said unit, said system comprising means defining an opening to receive the forward edge of the film and drawing;
an upper transparent plate in parallel fixed relationship to the platform; and
a pair of rollers, one positioned forwardly of the exposure unit and the other rearwardly of the exposure unit for carrying said drive belt, said forward roller having a plurality of lands radially formed about its periphery and lying in the path of movement of the film and drawing whereby the film and drawing are initially accurately fed into the exposure unit.

9. The combination as set forth in claim 8 wherein the rearward roller includes about its periphery a plurality of longitudinally formed lands for further maintaining the alignment of the film and drawing during their passage through the exposure unit.

10. The combination as set forth in claim 8 wherein there is provided an electrostatic field establishing means for initially charging the film, drawing and associated drive belt for holding them in mutual relationship, said electrostatic charge means located proximate the opening of the exposure unit.

11. The combination as set forth in claim 8 wherein said rearward roller is coupled to the output shaft of a variable speed motor for regulating the time of exposure of the film in said unit.

12. The combination as set forth in claim 8 wherein there is included in advance of the forward roller an edge alignment means for the film and drawing, said edge aligning means comprising an upper edge guide bar having a dowel for fitting it at a predetermined width position relative to the platform, said edge alignment means further having a lower brace portion positionable between a pair of notched bars for securing it against lateral movement.

13. The combination as set forth in claim 10 wherein said electrostatic field establishing means comprises an electrostatic bar and an electrically insulating insert mounted intermediate said bar and said belt, said insert having a plurality of openings formed in a divergent pattern for providing an electrostatic field of diminishing intensity proximate the edges of the film and drawing.

14. An apparatus for making a direct photographic reproduction from a drawing comprising:
a light exposure unit;
a support platform extending through said exposure unit;
a feed system including a continuous drive belt for simultaneously advancing a continuous sheet of film and the drawing over said platform through said unit;
means defining an opening to receive the forward edge of the film and drawing;
an edge alignment means mounted on said platform proximate the said opening to provide initial edge guidance to the film and drawing being introduced into the feed system, said edge alignment means comprising an upper bar selectively movable between a number of positions on the upper surface of the platform, said edge bar further having a lower portion and a bracing means fixed thereto for securing it in any one of the selected positions.

15. The combination as set forth in claim 14 wherein there is included in the feed system an idler roller positioned forwardly of the exposure unit and in engagement with said continuous drive belt, said roller further having a plurality of grooves radially formed about its circumference for insuring a properly oriented feed of the film and drawing into the unit.

16. The combination as set forth in claim 15 wherein there is provided proximate the exit from said exposure unit a rearward driven roller, said rearward roller having about its periphery a plurality of longitudinally formed lands for further maintaining the appropriate alignment of the film and drawing during their passage away from the exposure unit.

17. An apparatus for making a direct photographic reproduction from a loft drawing and the like, comprising:
a light exposure unit;
a support platform extending into said unit;

a feed system including a continuous drive belt for simultaneously advancing a sheet of film and drawing over said platform through said unit, said system comprising means defining an opening to receive the forward edge of the film and drawing;

an upper transparent plate in parallel fixed relationship to the platform;

a lower support mounted on the upper surface of said platform for providing a yieldable upward force to maintain the film and drawing together and in driven relationship with the continuous drive belt; and a drive roller and a driven roller for providing drive to said belt therebetween, said drive roller having formed about its periphery a plurality of longitudinally extending lands.

18. The combination as set forth in claim 17 wherein the driven roller includes about its periphery a plurality of radially formed lands aligned in the direction of drive belt movement for further maintaining the alignment of the film and drawing during entry into the exposure unit.

* * * * *